United States Patent Office 2,970,153
Patented Jan. 31, 1961

2,970,153

ALKOXYPHENYL-PROPIONYL ESTERS OF 17α-HYDROXYPROGESTERONE

Egon Richard Diczfalusy, Ronninge, and Ove Birger Fernö, Hans Jakob Fex, and Knut Bertil Högberg, Halsingborg, Sweden, assignors to Aktiebolaget Leo, Halsingborg, Sweden, a Swedish firm No Drawing. Filed July 27, 1959, Ser. No. 829,543

5 Claims. (Cl. 260—397.4)

The present invention relates to novel esters of 17α-hydroxy-progesterone of strong progestational activity.

The novel esters of the invention are esters of 17α-hydroxyprogesterone and β-(p-alkoxyphenyl)-propionic acids of the formula:

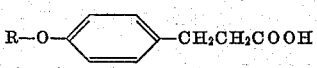

wherein R represents an alkyl group of 1 to 12 carbon atoms.

It is an object of this invention to provide the novel esters and a process of preparing the same.

The preferred manner of producing the esters of the invention is by reacting 17α-hydroxyprogesterone with an anhydride of a β-(p-alkoxyphenyl)-propionic acid of the above formula. The reaction is preferably carried out in solution in an inert solvent at a temperature between zero degrees centigrade and the boiling point of the reaction mixture, in the presence of an acid catalyst. Depending upon the reaction temperature and the ratio of the reactants, the reaction time will generally be within the range of 0.5–72 hours.

The preferred inert solvents are at present benzene, toluene, ether and chloroform, and the preferred acid catalyst is p-toluenesulphonic acid.

The esters of the invention have the general formula

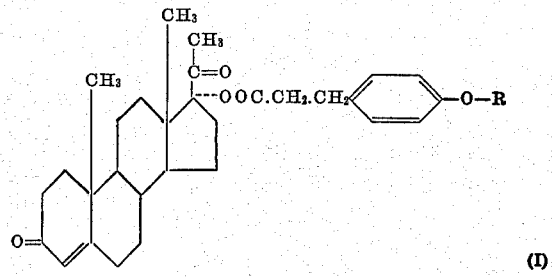

(I)

wherein R is as identified above.

Outstandingly superior duration of hormonal activity as compared with that of progesterone is exhibited particularly by the esters of Formula I of higher molecular weight, and some of the esters show good solubility in the solvents generally used for injection purposes, such as sesame oil and peanut oil.

The prolonged duration of activity was proved in pharmacological tests carried out with a number of the esters of the invention.

It was found that although 17α-hydroxyprogesterone does not possess any progestational activity, the esters of the Formula I do exhibit a surprisingly strong progestational activity in estradiol-primed immature rabbits.

Immature virgin rabbits were primed with daily doses of 5.0 μg. of 17β-estradiol in 0.5 ml. of peanut oil for 6 days. On the 7th day, the animals were injected intramuscularly with a single dose of an ester of the invention in peanut oil. The estradiol administration was then continued with daily doses of 0.5 μg. for 16 days. On the 17th day after administration of the ester of the invention, the animals were sacrificed, the uteri imbedded, serially sectioned and the progestational proliferation of the endometrium was estimated on a +1 to +4 basis, according to McPhail (J. Physiol. 83:145 (1934)). The results are shown in the following table where progesterone has been included for the purpose of comparison:

| Substance injected on the 7th day | Dose, mg. | Mean progestational proliferation |
|---|---|---|
| Progesterone | 20 | 0.8 |
| 17α - hydroxyprogesterone - 17 - β - (p - butoxy - phenyl)-propionate | 20 | 3.0 |
| 17α - hydroxyprogesterone - 17 - β - (p - ocyoxy-phenyl)-propionate | 20 | 2.0 |
| 17α - hydroxyprogesterone - 17 - β - (p - hexoxy-phenyl)-propionate | 20 | 2.5 |

It is obvious from the table that the esters of the invention are suitable for use in the development of hormone preparations for human therapy which can maintain the secretion phase of the uterus for a significantly prolonged period of the time by one single injection.

The following examples are illustrative of the process and products of the present invention, but are not to be construed as limiting.

Example 1

A mixture of 1.5 g. 17α-hydroxyprogesterone, 3.9 g. β-(p-methoxyphenyl)-propionic acid anhydride, 0.6 g. p-toluene-sulphonic acid and 50 ml. dry benzene was warmed upon a steam bath for 10 minutes to yield a clear solution. The reaction mixture was left at room temperature with exclusion of moisture for 48 hours, whereupon a mixture of pyridine and water was added in order to destroy unreacted acid anhydride. The solution was again left for 24 hours and then shaken with a mixture of equal parts of ether and ethylacetate. The resulting organic extract was separated from the aqueous layer and washed with dilute hydrochloric acid, water, an aqueous solution of potassium carbonate, and water in the said order. After drying over sodium sulphate, the ether-ethylacetate-benzene solution was evaporated to dryness. The remaining oil was chromatographed on alumina, and the fractions obtained by eluating with benzene-hexane (1:1 and 4:1) were evaporated to dryness in vacuum. The residue consisted of 17α-hydroxyprogesterone-17-β-(p-methoxyphenyl)-propionate, melting at 137–138° C. after recrystallisation from a mixture of hexane and iso-propylether. $[\alpha]_D^{20} = +43°$ (c.=1 in dioxane).

Example 2

1.5 g. 17α-hydroxy-progesterone were esterified with 4.8 g. β-(p-butoxyphenyl)-propionic acid anhydride according to the procedure of Example 1. The resulting 17α-hydroxyprogesterone-17-β-(p-butoxyphenyl)-propionate melts at 108–109° C. $[\alpha]_D^{20} = +40°$ (c.=1 in dioxane).

Example 3

1.5 g. 17α-hydroxyprogesterone were esterified with 5.4 g. β-(p-pentoxyphenyl)-propionic acid anhydride according to the procedure of Example 1. The resulting 17 α - hydroxyprogesterone - 17 - β - (p - pentoxyphenyl)-propionate melts at 91–93° C. $[\alpha]_D^{20} = +39°$ (c.=1 in dioxane).

Example 4

1.5 g. 17α-hydroxyprogesterone were esterified with 5.4 g. β-(p-iso-pentoxyphenyl)-propionic acid anhydride according to the procedure of Example 1. The resulting 17α - hydroxyprogesterone - 17 - β - (p - isopentoxyphenyl)-propionate melts at 109–110° C. $[\alpha]_D^{20} = +40°$ (c.=1 in dioxane).

*Example 5*

1.5 g. 17α-hydroxyprogesterone were esterified with 5.5 g. β-(p-hexoxy-phenyl)propionic acid anhydride according to the procedure of Example 1. The resulting 17α-hydroxyprogesterone - 17 - β - (p - hexoxyphenyl) - propionate melts at 97–80° C. $[\alpha]_D^{20} = +39°$ (c.=1 in dioxane).

*Example 6*

1.5 g. 17α-hydroxyprogesterone were esterified with 5.8 g. β - (p - heptoxyphenyl) - propionic acid anhydride according to the procedure of Example 1. The resulting 17α - hydroxyprogesterone - 17 - β - (p - heptoxyphenyl)-propionate is obtained as a colourless oil from a mixture of hexane and isopropylether. $[\alpha]_D^{20} = +38°$ (c.=1 in dioxane).

*Example 7*

1.5 g. 17α-hydroxyprogesterone were esterified with 6.1 g. β-(p-octoxyphenyl)-propionic acid anhydride according to the procedure of Example 1. The resulting 17α - hydroxyprogesterone - 17 - β - (p - octoxyphenyl)-propionate melts at 42–45° C. $[\alpha]_D^{20} = +38°$ (c.=1 in dioxane).

*Example 8*

1.5 g. 17α-hydroxyprogesterone were esterified with 7.3 g. β-(p-dodecyloxyphenyl)-propionic acid anhydride according to the procedure of Example 1. The resulting 17α - hydroxyprogesterone - 17β - (p - dodecyloxyphenyl)-propionate is obtained as a colourless oil from a mixture of hexane and isopropylether. $[\alpha]_D^{20} = +36°$ (c.=1 in dioxane).

We claim:

1. Esters of 17α-hydroxyprogesterone having the general formula:

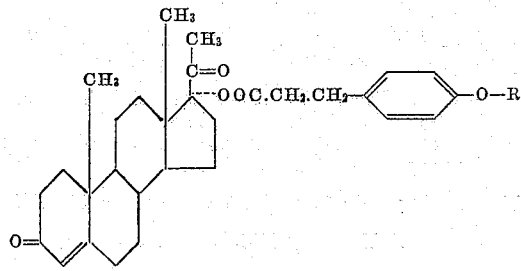

wherein R represents an alkyl group with from one to twelve carbon atoms inclusive.

2. 17α - hydroxyprogesterone - 17 - β - (p - butoxyphenyl)-propionate.

3. 17α - hydroxyprogesterone - 17 - β - (p - pentoxyphenyl) - propionate.

4. 17α - hydroxyprogesterone - 17 - β - (p - hexoxyphenyl)-propionate.

5. 17α - hydroxyprogesterone - 17 - β - (p - octoxyphenyl)-propionate.

References Cited in the file of this patent

UNITED STATES PATENTS 2,753,360    Kaspar et al.    July 3, 1956